United States Patent
Curran

[15] 3,690,710
[45] Sept. 12, 1972

[54] SHOCK ABSORBING BUMPER

[72] Inventor: Michael G. Curran, 11608 Detroit Avenue, Cleveland, Ohio 44102

[22] Filed: May 12, 1971

[21] Appl. No.: 142,488

[52] U.S. Cl.................................293/71 R, 293/60
[51] Int. Cl.............................................B60r 19/08
[58] Field of Search...............293/60, 70, 71 R, 71 P; 114/219

[56] References Cited

UNITED STATES PATENTS

| | | | |
|---|---|---|---|
| 1,485,332 | 2/1924 | Edwards | 293/60 |
| 3,418,815 | 12/1968 | Kumazawa | 293/71 R X |
| 3,514,144 | 5/1970 | Alderfer | 293/71 R |

*Primary Examiner*—Gerald M. Forlenza
*Assistant Examiner*—Robert Saifer
*Attorney*—Bosworth, Sessions, Herrstrom & Cain

[57] ABSTRACT

An improved shock absorbing bumper is provided for use on automobiles and the like in which, in one form, a backing plate supports an elastomeric body or pad having at its front a plurality of longitudinally extending elastomeric tubes. The tubes nest within corrugations of a corrugated panel which, upon being struck, compresses the tubes and elastomeric body during movement of the panel toward the back or support plate. Preferably, an elastomeric cover substantially encompasses the body, tubes, and corrugated panels and has terminal portions secured to the support plate. The tubes are preferably closed at their ends and may contain rubber pellets, liquids, compressed gas, and the like.

15 Claims, 5 Drawing Figures

PATENTED SEP 12 1972

3,690,710

INVENTOR.
MICHAEL G. CURRAN
BY Braunath, Sessions, Hermstrom & Cain
ATTORNEYS

SHOCK ABSORBING BUMPER

BACKGROUND OF THE INVENTION

The present invention relates to a bumper for absorbing shock by a yielding action during collision with other objects. Although the invention is described in connection with passenger automobiles, the present bumper may be used wherever protection against collision is needed, such as on ships, bows of tugs, barges, land vehicles in general including trucks, loading docks, piers, and wherever durability and cushioning are desirable.

The failure of modern day automobile bumpers to absorb the thrust of collisions without damaging the automobile is notorious. In the history of the automobile bumper, functionality has yielded to style. More and more the bumper has become incorporated into the design of an automobile until today the protection afforded is really minimal. Tests have shown that today's automobiles cannot withstand even a 5 mile per hour front or rear end collision without damage to the grill, sides, or other parts of the automobile. Costly repair bills are incurred for collisions occurring at speeds even less than 5 miles per hour. In fact, according to newspaper reports, The Department of Transportation's National Highway Traffic Safety Administration has proposed requiring by Aug. 1, 1972 that automobiles be built to withstand 5 mile per hour crashes into a pendulum device that simulates an unloaded vehicle.

It would, therefore, advance the art to provide a shock absorbing bumper which affords greater protection against collisions to whatever it may be attached and which itself can be repaired with minimum cost.

SUMMARY OF THE INVENTION

The present bumper is designed to absorb impact energy by an association of different structurally designed members which deflect and compress upon impact to dissipate the force of a collision.

In one form, the bumper construction comprises a longitudinally extending, rigid backing plate supporting a resilient, compressible elastomeric body held with respect to the plate and extending lengthwise thereof. A plurality of hollow compressible members fixed with respect to the elastomeric body also extend lengthwise thereof in substantial parallel relation. A corrugated panel overlies the hollow members and has corrugations to engage the members and compress them and the elastomeric body upon movement of the panel toward the support plate. Preferably, an elastomeric cover substantially encompasses the body, the hollow members, and the corrugated panel and has terminal portions secured to the support plate.

Various modifications are possible. The support plate may have outwardly extending flanges which engage the sides of the elastomeric body. To rigidify the assembly, bolt means may be used which extends from the corrugated panel through the support plate. The bolt means is designed to accommodate movement of the panel, hollow members, and elastomeric body toward the support plate and to restrict movement of such parts from their normal positions away from the support plate.

Preferably, the hollow members are elastomeric tubes sealed at their ends and may contain either elastomeric pellets, a liquid, or a gas under pressure. Still other modifications are possible as will be apparent from the following description.

BRIEF DESCRIPTION OF THE DRAWING

The accompanying drawing illustrates presently preferred embodiments in which.

DESCRIPTION OF THE PREFERRED EMBODIMENTS

Figure 1:
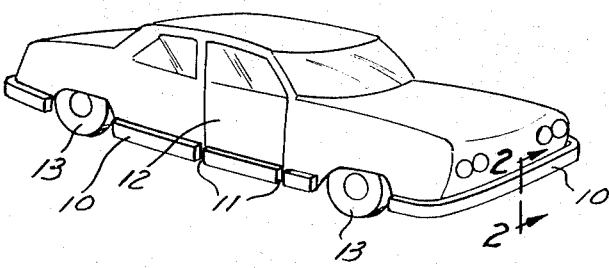
FIG. 1 is a perspective view of an automobile equipped with the present bumper construction.

The present bumper may extend entirely around the perimeter of an automobile as shown at 10 in FIG. 1 to protect it from all sides. Suitable gaps are provided as at 11 so that doors 12 may be opened or wheels 13 may be readily reached for servicing, and the like.

Figure 2:
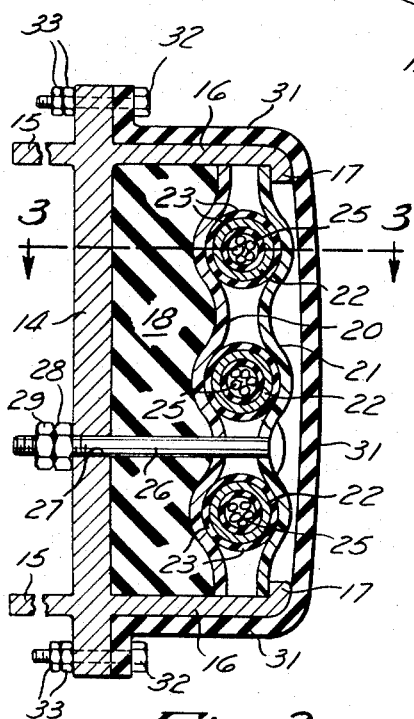
FIG. 2 is a vertical section of the bumper construction of FIG. 1 taken on the line 2—2.
Figure 3:
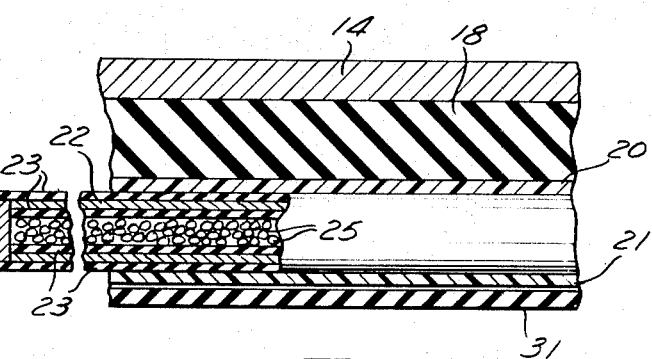
FIG. 3 is a longitudinal section of the bumper construction of FIG. 2 taken on the line 3—3.

Referring initially to the embodiment of FIGS. 2 and 3, this construction comprises a rigid, backing or support metal plate 14 having a pair of integral flanges 15 for mounting to an automobile or the like. Forwardly extending, integral flanges 16 have ends 17 turned toward one another. A resilient, compressible elastomeric body 18 fills the channel between the flanges and extends longitudinally along the backing plate 14. The body 18, which may comprise a mat of sponge or foamed rubber, may be secured in sections to the plate 14 as by the use of conventional rubber adhesives or cements, or it may be freely confined against the plate as by the flanges 16 as hereinafter described.

The outward face of the body or mat 18 is preferably grooved to match the configuration of a corrugated panel 20 which coacts with a similar but reversely curved corrugated panel 21 to define circular nesting areas for a plurality of hollow, compressible members 22. These members extend in spaced, parallel relation longitudinally of the backing plate 14. The corrugated panels 20 and 21 are preferably molded or extruded from conventional plastic materials, such as thermosetting resins like phenol-formaldehyde, urea-formaldehyde, epoxy resins, melamine- formaldehyde, phenol-furfural; or thermoplastic resins like polyacrylic acid, polyacrylic esters, polyvinyl acetate, polyvinyl chloride, cellulose acetate, polyethylene, polypropylene, polystyrene, nylon, and the like. In any case, mineral fibers such as glass fibers are preferably dispersed in the resin to increase strength and impact resistance. The compressible hollow members 22 are preferably tubular and, in the embodiment of FIGS. 2 and 3, comprise metal tubes having an elastomeric coating 23. Plugs 24 seal the ends of the tubes 22 which may contain material designed to aid in the absorption of energy from a collision. In this embodiment, such material comprises pellets 25 of rubber or other plastic which substantially fill all the tubes 22.

The function of the tubes 22 is to collapse in yielding fashion so as to absorb shock. To this end, the tubes 22 may be fabricated to be more or less resistant to collapse as may be desired. The tubes, for example, may be made from yieldable metal such as aluminum, tinplate, copper, or the like, coated with rubber. Alternatively, the tubes may be entirely elastomeric as hereinafter described to facilitate recovery of their original form after a collision, although such tubes offer less resistance to collapse.

The mat 18, panels 20 and 21, tubes 22 and flanges 16 are so dimensioned that the turned ends 17 of the flanges overlie adjacent edges of the corrugated panel 21 to retain such panel and the other component parts between the flanges 16 even when such members are in their normal, non-compressed condition.

In order to hold together the component parts of the bumper construction and reduce rattling and the like, some anchoring means is preferably incorporated in the bumper structure. Yet, the anchoring means must not interfere with the yielding, shock-absorbing capacity of the bumper. This is accomplished in the embodiment of FIGS. 2 and 3 by one or more bolt means 26 which extends through the corrugated panels 20 and 21, between adjacent tubes 22 and through the pad 18 and an opening 27 in the backing plate 14. A nut 28 and lock nut 29 hold the bolt means 26 in place. In this manner, the bolt means accommodates movement of the panels 20 and 21, tubes 22, and compression of the pad 18 toward the support plate 14 or toward the left as viewed in FIG. 2, while restricting movement thereof away from the plate or to the right as viewed in FIG. 2.

An elastic cover 31 encompasses the flanges 16 and the component parts of the bumper contained in the channel defined by the flanges. The upper and lower terminal sides of the cover 31 are suitably secured to the backing plate 14 as by conventional rubber cement or by fastening means such as bolts 32 and nuts 33. Since the cover 31 is the first part of the bumper construction that is normally struck during a collision, the cover must be deformable or stretchable in order to take advantage of the deformability and compressibility of the panels 20 and 21, tubes 22, and mat 18. However, for the same reason, the elastomer of cover 31 preferably has superior wearing qualities as compared to the elastomer of the mat 18 or the tube covering 23 or of the tubes themselves should they be composed entirely of rubber.

The elastomer of cover 31 preferably has a hardness exceeding that of the elastomer of the pad 18 and the elastomer of the tube covering 23 or any tube. The cover may be fabricated from what is termed in the art as "live" rubber, that, is, rubber having the characteristic of compressing and expanding repeatedly with the application and removal of compressive forces.

Another elastomer that performs well as the cover 31 comprises the polyurethanes which have outstanding abrasion, cut and tear resistance. The manufacture and shaping of polyurethanes are known in the art. For example, polyurethane elastomers are produced from the inter-reaction of polyisocyanates and polyhydroxy compounds to form long chain molecules which are then chain-extended and/or cross-linked. Polyurethane elastomers may be processed on standard extrusion, injection molding, or transfer molding equipment. As an example, cover 31 may have a modulus of elasticity of about 75 kilograms per square centimeter. The cover may have a coating of decorative paint if desired.

Figure 4:
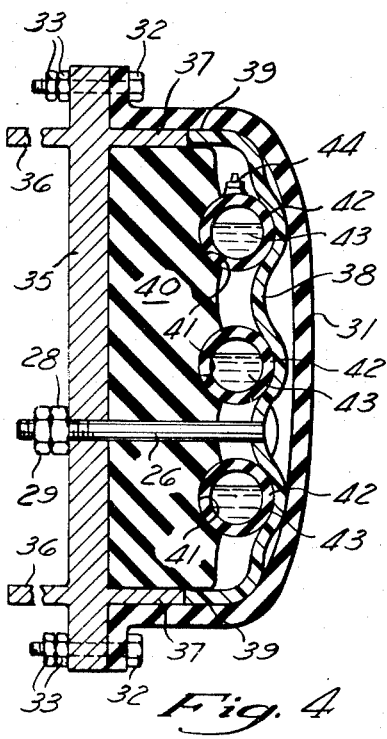
FIGS. 4 and 5 are vertical sections like FIG. 2 but illustrate various structural modifications.
Figure 5:
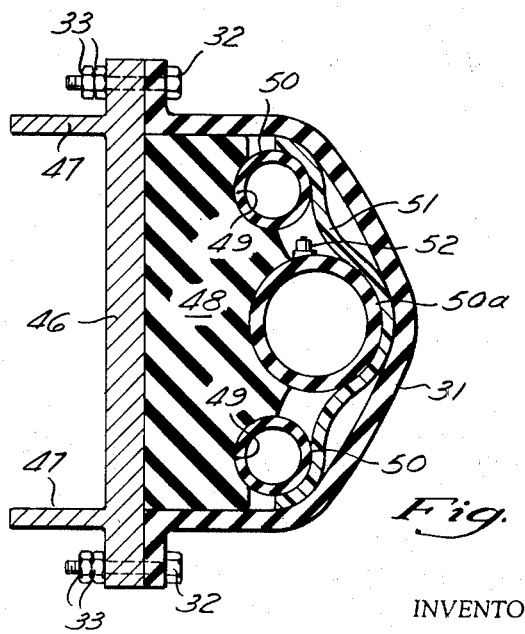

The embodiments of FIGS. 4 and 5 illustrate some of the modifications possible with the present bumper construction. Wherever the structural elements are the same or closely similar to the corresponding element of the embodiment of FIGS. 2 and 3, they are indicated by the same reference number.

In FIG. 4, the bumper construction comprises a backing plate 35 having mounting flanges 36 as in FIGS. 2 and 3, but forwardly extending flanges 37 do not reach as far. There is only one corrugated frame or panel 38 whose ends 39 turn toward plate 35 and are substantially aligned with and abut against the ends of the flanges 37. An elastomeric pad 40 fills the channel between flanges 37 and may be cemented against the plate 35 or freely held thereagainst. The pad 40 is grooved as at 41 to receive elastomeric hydraulic tubes 42 which also are optionally cemented in the grooves or held thereagainst by the overlying panel 38 in the corrugations of which the tubes 42 nest. These tubes are entirely elastomeric and sealed at their ends. In this embodiment, the tubes 42 contain a liquid 43 to aid in absorbing energy as from a collision. If the liquid is not to be expelled from a tube 42 during a collision, the tube is only partially filled with the liquid to permit compression of the tube to an elliptical cross-section. However, the tubes may be equipped with a standard pressure relief valve 44, and in this case it is preferred to fill the tubes with the liquid and allow for partial expulsion of it through the valve 44 upon impact. Water may be used as the liquid 43. When an automobile is to be driven in temperatures below freezing, a liquid antifreeze may be used as the liquid such as ethylene glycol. An elastomeric cover 31 encompasses all of the parts and has its marginal edges fixed to the plate 35 by bolts 32 and nuts 33. Bolt means 26 extends through the panel 38, between tubes 42 through the pad 40 and plate 35 in order to accommodate and direct movement of the panel, tubes, and pad toward the plate. Nuts 28 and 29 on the bolt means restrict movement of the same parts away from the plate.

In the embodiment of FIG. 5, a backing plate 46 has only mounting flanges 47 but no forwardly extending flanges. A sponge or foamed rubber mat 48 is cemented or held against the plate 46 by the remaining parts. The mat 48 is grooved at 49 to receive a series of entirely elastomeric tubes 50 which also are either cemented to or held in the grooves 49. The center tube 50a is larger in diameter than its companion tubes. A corrugated panel 51 overlies all of the tubes, while an elastomeric cover 31 has its upper and lower edge portions secured to the back plate 47 by bolts 32 and nuts 33.

In this embodiment (FIG. 5), the tubes 50 are sealed at their ends and contain a gas such as air under pressure. Gas may be admitted to a tube 50 through a conventional air valve 52 such as is used on automobile innertubes and tires. In fact, this embodiment has the advantage that the tubes 50 can be maintained at a desired pressure by use of air pumps at service stations.

It is understood that any modification can be used singly or in combination with one or more of the other modifications.

The operation of all of the embodiments is the same. All of the parts except the backing plate are designed to oppose yieldingly impact forces and in an amount commensurate with the magnitude of the forces applied up to the limit of the bumper construction. The center of the cover being elastomeric is initially forced inwardly, that is, toward the backing plate. The corrugated panel also moves inwardly toward the backing plate and tends to distribute the force of impact in a more uniform manner over the face of the forward bumper construction. However, the frame can flex inwardly under impact, particularly in the embodiment of FIG. 4. The tubes and mat are compressed similarly. The relatively stiff resistance afforded by the bumper increases as the described elements are compressed more and more toward the backing plate with the result that backlash is reduced and the force of impact is dissipated.

Should a part of the bumper become damaged through collision, such as a cover or a corrugated panel or a tube, it is easily and inexpensibly replaced without incurring appreciable repair expense.

While the foregoing describes several embodiments of the present invention, it is understood that the invention may be practiced in still other forms within the scope of the following claims.

I claim:

1. A bumper construction comprising a longitudinally extending support plate, a resilient compressible elastomeric body secured with respect to said plate and extending lengthwise thereof, a plurality of hollow, compressible members fixed with respect to said elastomeric body and extending lengthwise thereof in substantially parallel relation, a corrugated panel overlying the hollow members and having corrugations to engage said members and to compress said members and elastomeric body upon movement of the panel toward said support plate, and an elastomeric cover substantially encompassing said body, hollow members, and corrugated panel and having terminal portions secured to said support plate.

2. The bumper construction of claim 1 in which said support plate has outwardly extending flanges which engage the sides os said elastomeric body.

3. The bumper construction of claim 2 in which said flanges abut against the corrugated panel.

4. The bumper construction of claim 2 in which the outer ends of said flanges are turned toward one another and overlie adjacent edges of the corrugated panel to retain said panel, hollow members, and elastomeric body between said flanges.

5. The bumper construction of claim 1 including bolt means extending from the corrugated panel through said support plate, said bolt means accommodating movement of said panel, hollow members, and elastomeric body toward the support plate while restricting movement thereof away from the support plate.

6. The bumper construction of claim 1 in which said hollow members are elastomeric tubes sealed at their ends and containing elastomeric pellets.

7. The bumper construction of claim 1 in which said hollow members are elastomeric tubes sealed at their ends and incompletely filled with a liquid.

8. The bumper construction of claim 1 in which said hollow members are elastomeric tubes sealed at their ends and containing a gas under pressure.

9. The bumper construction of claim 8 in which said tubes have valve means to admit gas under pressure.

10. The bumper construction of claim 1 in which said hollow members are elastomeric tubes adhered to said elastomeric body.

11. The bumper construction of claim 1 including a second corrugated panel interleaved between said elastomeric body and said hollow compressible members.

12. The bumper construction of claim 1 in which said hollow, compressible members are tubes, and one tube has a diameter greater than the other tubes.

13. The bumper construction of claim 1 in which said compressible elastomeric body comprises foamed rubber.

14. The bumper construction of claim 1 in which said hollow members are elastomeric, and the elastomer of said cover has a hardness exceeding that of the elastomers of said body and hollow members.

15. The bumper construction of claim 1 in which said elastomeric body has grooves to receive said hollow compressible members.

* * * * *